United States Patent [19]

Moskovich

[11] Patent Number: 5,808,804
[45] Date of Patent: Sep. 15, 1998

[54] PROJECTION TELEVISION LENS SYSTEM

[75] Inventor: Jacob Moskovich, Cincinnati, Ohio

[73] Assignee: U.S. Precision Lens Inc., Cincinnati, Ohio

[21] Appl. No.: 715,028

[22] Filed: Sep. 17, 1996

Related U.S. Application Data

[60] Provisional application No. 60/004,116 Sep. 21, 1995.

[51] Int. Cl.$^6$ ....................................................... G02B 3/00
[52] U.S. Cl. ........................... 359/649; 359/713; 359/756
[58] Field of Search ..................................... 359/648, 649, 359/708, 713, 714, 756, 757

[56] References Cited

U.S. PATENT DOCUMENTS

| | | |
|---|---|---|
| 4,300,817 | 11/1981 | Betensky . |
| 4,348,081 | 9/1982 | Betensky . |
| 4,526,442 | 7/1985 | Betensky . |
| 4,682,862 | 7/1987 | Moskovich . |
| 4,697,892 | 10/1987 | Betensky . |
| 4,755,028 | 7/1988 | Moskovich . |
| 4,761,063 | 8/1988 | Yoshioka et al. . |
| 4,776,681 | 10/1988 | Moskovich . |
| 4,815,831 | 3/1989 | Betensky . |
| 4,900,139 | 2/1990 | Kreitzer . |
| 4,963,007 | 10/1990 | Moskovich . |
| 4,989,961 | 2/1991 | Yoshioka .................................. 359/756 |
| 4,993,816 | 2/1991 | Yoshioka et al. . |
| 5,055,922 | 10/1991 | Wessling . |
| 5,148,320 | 9/1992 | Toide . |
| 5,296,967 | 3/1994 | Moskovich . |
| 5,329,363 | 7/1994 | Moskovich . |
| 5,404,246 | 4/1995 | Kaneko et al. .......................... 359/649 |

OTHER PUBLICATIONS

*The Handbook of Plastic Optics*, U.S. Precision Lens, Inc., Cincinnati, Ohio, 1983, pp. 17–29.

Dunham, C.B., and C.R. Crawford, "Minimax Approximation by a Semi–Circle," *Society for Industrial and Applied Mathematics*, vol. 17, No. 1, Feb., 1980.

*Primary Examiner*—Loha Ben
*Attorney, Agent, or Firm*—Maurice M. Klee

[57] ABSTRACT

Six-component projection lens systems for use in projection televisions are provided. From the screen side, the systems preferably have a + − +++ − configuration. The use of a second lens element having a negative power results in improved sagittal modulation transfer functions (MTFs) at large field locations. The negative second lens element can be made of a low dispersion material, such as styrene, so as to provide partial correction of axial color.

19 Claims, 14 Drawing Sheets

PROJECTION TELEVISION LENS SYSTEM

CROSS REFERENCE TO RELATED PROVISIONAL APPLICATION

This application claims the benefit under 35 USC §119(e) of U.S. Provisional application Ser. No. 60/004,116 filed Sep. 21, 1995.

BACKGROUND OF THE INVENTION

1. Field of the Invention

This invention relates to projection lens systems for use in projection televisions and, in particular, to improved projection lens systems having: (1) a wide field of view, e.g., a semi-field of view on the order of about 40°; (2) a low f-number, e.g., a f-number on the order of about 1.0; and (3) an improved sagittal modulation transfer function (MTF) in comparison to prior art lens systems having a similar construction.

2. Description of the Prior Art

Projection lens systems for CRT projection televisions have undergone continuing development during the past fifteen years or so. As a result, many of today's CRT projection televisions are equipped with fast lens systems having f-numbers of f/1 and smaller and provide semi-fields of view of 25° and wider.

Color images for projection televisions are normally obtained by combining images from three color CRTs, i.e., a red CRT, a green CRT, and a blue CRT. So that the images from the three CRTs will lie substantially on top of one another at the viewing screen, i.e., to minimize color fringing, projection lens systems used in projection televisions are normally corrected for transverse chromatic aberration, i.e., the variation with wavelength of the height of an image point above the optical axis. Transverse chromatic aberration is also known as the chromatic difference in magnification or simply lateral color. This correction is usually achieved by locating the lens system's stop in the proximity of the system's power unit.

For many applications, the projection lens system does not need to be corrected for longitudinal chromatic aberration, i.e., the variation with wavelength of the location along the optical axis of an axial image point. Longitudinal chromatic aberration is also known as axial chromatic aberration or simply axial color. When not corrected by the lens system, this aberration is dealt with by physically adjusting the location of the lens system and its associated CRT with respect to the screen, i.e., by adjusting the front and back conjugates to compensate for the change in focal length of the lens system with wavelength.

The phosphors used in commercially available CRTs do not emit light at a single wavelength. In particular, green phosphors have significant sidebands in blue and red. Similar polychromaticity exists for red and blue phosphors, but to a lesser extent.

For certain applications, such as, high definition television, data displays, or systems which operate at a high magnification, lens systems which are fully or partially corrected for axial color are needed to avoid visible color fringing and/or loss of image contrast as a result of the color spread of CRTs. See, for example, Betensky, U.S. Pat. No. 4,815,831, Kreitzer, U.S. Pat. No. 4,900,139, and Moskovich, U.S. Pat. No. 4,963,007. Such fully or partially color corrected lens systems, however, are more complex and thus more expensive than non-color corrected systems. Accordingly, these systems are often not used in consumer applications.

Wessling, U.S. Pat. No. 5,055,922, discloses a less expensive approach for addressing the color spread problem. In accordance with this approach, a filter material that absorbs at least some of the undesired CRT sidebands is incorporated in one or more elements of the lens system. Although this approach significantly reduces the light intensity in the sidebands, it does not completely eliminate them. Also, the filter material approach does not change the lens system's overall aberration behavior.

When the field of view of a projection lens system does not exceed a half-angle of about 25°, the lens system may consist of just three components and still provide a sufficiently high level of image quality. A typical configuration has a weak aspherical element on the image side of the lens system, followed by a strong positive power element, followed in turn by a strong negative element in close proximity to the CRT. See, for example, Betensky, U.S. Pat. Nos. 4,300,817, 4,348,081, and 4,526,442.

For this configuration, the aspherical first element provides most of the correction of spherical aberration and other aperture dependent aberrations, the positive element in combination with the relative position of the aperture stop of the lens system allows for the astigmatism to be corrected, and the negative element close to CRT provides correction for the field curvature of the lens.

When the focal length of the lens system is shortened to make the projection television more compact, the field coverage of the lens system must be increased. When the half-angle of view is increased to about 28°, a three element form generally cannot provide an appropriately high level of optical performance. To address this problem, a fourth element (corrector element) has been added between the strong positive and the strong negative elements of the three component configuration. See Betensky, U.S. Pat. No. 4,697,892, and Moskovich, U.S. Pat. Nos. 4,682,862, 4,755,028, and 4,776,681. This additional element usually does not have much optical power; however, it must have an aspherical surface to correct for aperture dependent off-axis aberrations like sagittal oblique spherical and coma. Four element configurations have been used effectively up to half-angles of 33° to 35°. Five element configurations are also known in the art. See the Moskovich '862 and '681 patents, supra.

As the demands on the performance of the lens system have increased, six element systems have come into use. Moskovich, U.S. Pat. Nos. 5,296,967 and 5,329,363, disclose systems of this type. Although these systems have worked successfully in practice, it has been found that their modulation transfer functions, in particular, their sagittal modulation transfer functions, have lower values than desired at large field locations (field angles).

FIGS. 5 and 6 show represent MTFs for such prior art 6-element projection lens systems. In particular, FIG. 5 shows the MTF for a commercial embodiment of the lens system of the '363 patent and FIG. 6 shows the MTF of the lens system of FIG. 2 of the '967 patent.

The plots of FIGS. 5 and 6 (as well as those of FIGS. 1B, 1C, 2B, 2C, 3B, 4B, and 4C) show the through-focus MTF on the left and the optical transfer function (OTF) at best axial focus on the right. The data are shown for five field points, viz., the axis, 0.35H, 0.70H, 0.85H and 1.0H, where H is the maximum field height on the screen. The actual field heights are shown for the right hand plots. These field heights apply to both the right hand and left hand plots and are in millimeters.

The through-focus data are at the indicated spatial frequency in cycles per millimeter, i.e., at 2 cycles/mm. This spatial frequency value is frequently used in evaluating the performance of projection television systems since it corresponds to approximately 400 TV lines in the horizontal direction for a five-inch diagonal image on a typical seven-inch CRT tube. A 400 TV line resolution corresponds to the maximum resolution specification for most laser disc players. Both the through-focus and best-focus data indicate tangential (solid curves) and sagittal (dashed curves) MTF. The modulus scale is on the left of each block and runs from zero to one. The phase of the OTF is shown as a dotted curve in the best-focus plots. The scale for the phase is indicated on the right of each best-focus block and is in radian measure. All the OTF data are for a wavelength of 546.1 nanometers. The axial focus shift indicated above the best-focus plots is relative to the zero position of the through-focus plots The best-focus plane is at the peak of the axial through-focus plot.

An examination of FIGS. 5 and 6 show that the prior art lens systems of these figures have sagittal MTFs at 2 cycles/mm that are less than about 0.5 at field locations of 0.85H and above. These values are below what is desired for a top quality image across the entire field of view of a projection television. The present invention is directed to improving these sagittal MTFs to further enhance the quality of the images produced by projection televisions.

SUMMARY OF THE INVENTION

In view of the foregoing state of the art, it is an object of the present invention to provide improved projection lens systems for use in projection televisions and, in particular, in rear projection televisions.

More particularly, it is an object of the invention to provide projection lens systems capable of covering a semi-field of view of up to about 40° at a f-number on the order of 1.0, while at the same time providing an image quality which is sufficiently high to satisfy the requirements of modern consumer projection TV systems, specifically, an image quality corresponding to a relatively high sagittal MTF at large field locations.

It is an additional object of the invention to provide projection lens systems having the foregoing characteristics which are also partially corrected for axial color.

It is a further object of the invention to provide projection lens systems which can be manufactured at a reasonable cost.

To achieve the foregoing and other objects, the invention provides a projection lens system for use in combination with a cathode ray tube (CRT) comprising in order from the image side:

(a) a first lens element which has a positive power, at least one aspheric surface, and an overall meniscus shape which is concave to the CRT;

(b) a second lens element which has a negative power and at least one aspheric surface;

(c) a third lens element which has a positive power and provides a substantial portion of the power of the lens system;

(d) a fourth lens element which has a weak power, at least one aspheric surface, and an overall meniscus shape which is concave to the CRT;

(e) a fifth lens element which has a positive power, at least one aspheric surface, and a CRT facing surface the majority of which is convex to the CRT; and (f) a lens unit which has a strong negative power, is associated with the CRT during use of the lens system, and provides most of the correction for the field curvature of the lens system.

In certain preferred embodiments, the lens system has some or all of the following characteristics: (1) the first lens element is composed of a high dispersion material in accordance with the teachings of U.S. Pat. No. 5,329,363; (2) each of the first, second, fourth, and fifth lens elements has two aspheric surfaces; (3) the third lens element is biconvex and provides the majority of the power of the lens system, i.e., the focal length of the third lens element is between about 0.8 and about 1.6 times the focal length of the entire lens system; and (4) the fourth lens element has a positive power.

In other preferred embodiments, the second lens element is composed of a high dispersion material and the third lens element is composed of a low dispersion material to provide a partially color corrected lens system.

As used herein, the term "weak" is used to describe an element whose focal length has a magnitude which is at least about 2.5 times the effective focal length of the entire lens system, and the term "strong" is used to describe an element or unit whose focal length has a magnitude which is less than about 2.5 times the effective focal length of the entire lens system.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

Figure 1A:
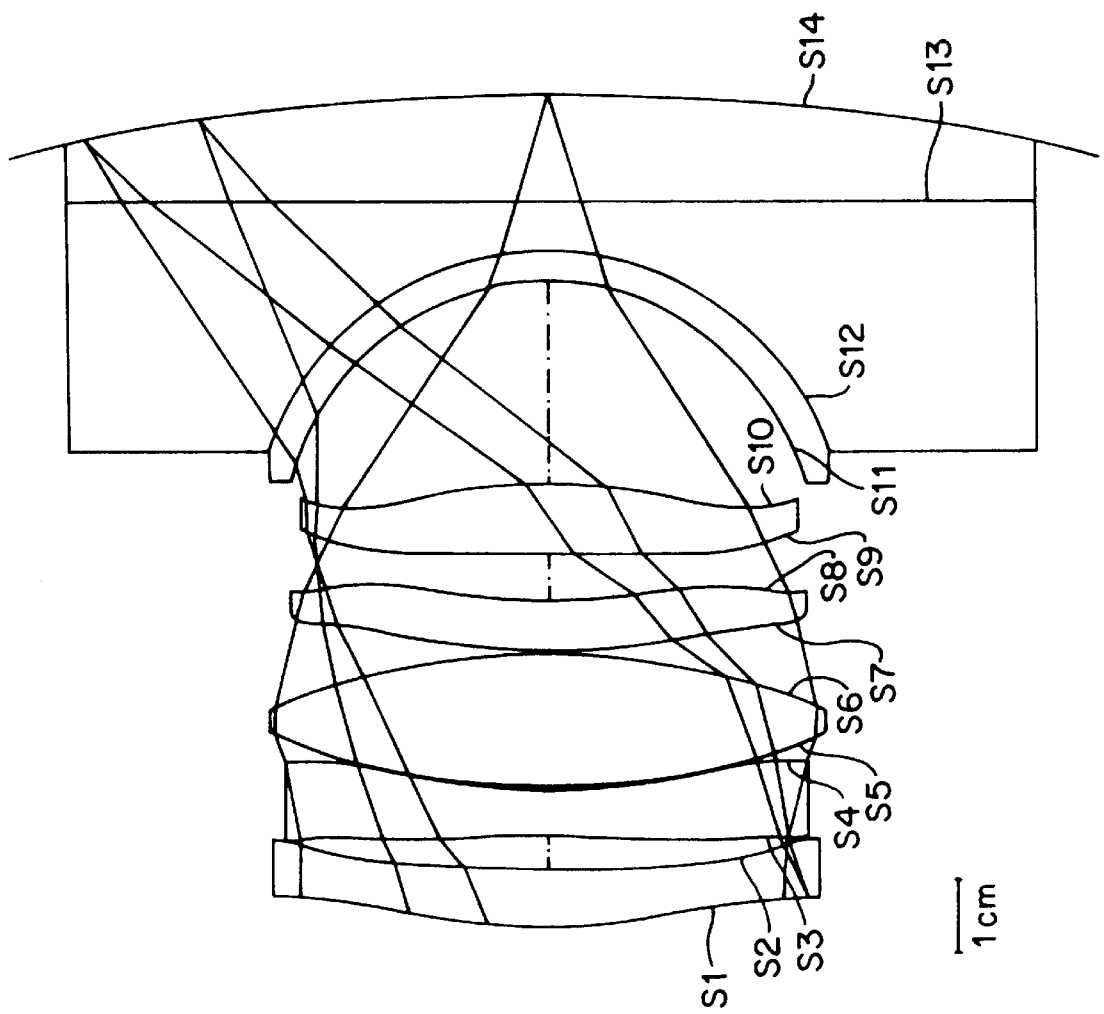
FIGS. 1A, 2A, 3A, and 4A are schematic side views of lens systems constructed in accordance with the invention.
Figure 1B:
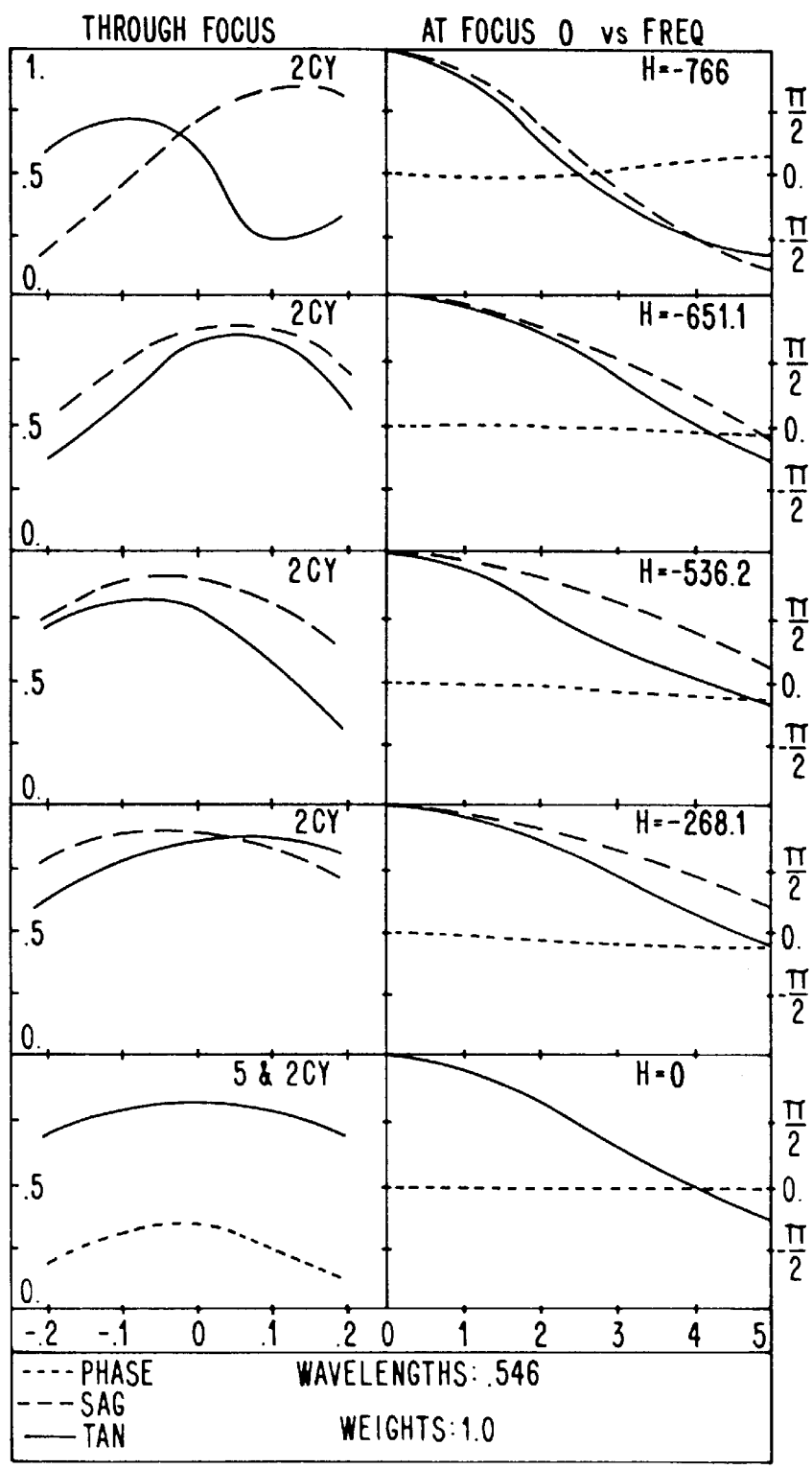
FIGS. 1B, 1C, 2B, 2C, 3B, 4B, and 4C are MTF/OTF plots for the lens systems of FIGS. 1A, 2A, 3A, and 4A, respectively.

The focal length, magnification, f/number, object height, and image height for the monochromatic optical transfer function plot of FIG. 1B are 67.22, −0.094, 1.11, −766.00, and 64.55, respectively.

Figure 1C:
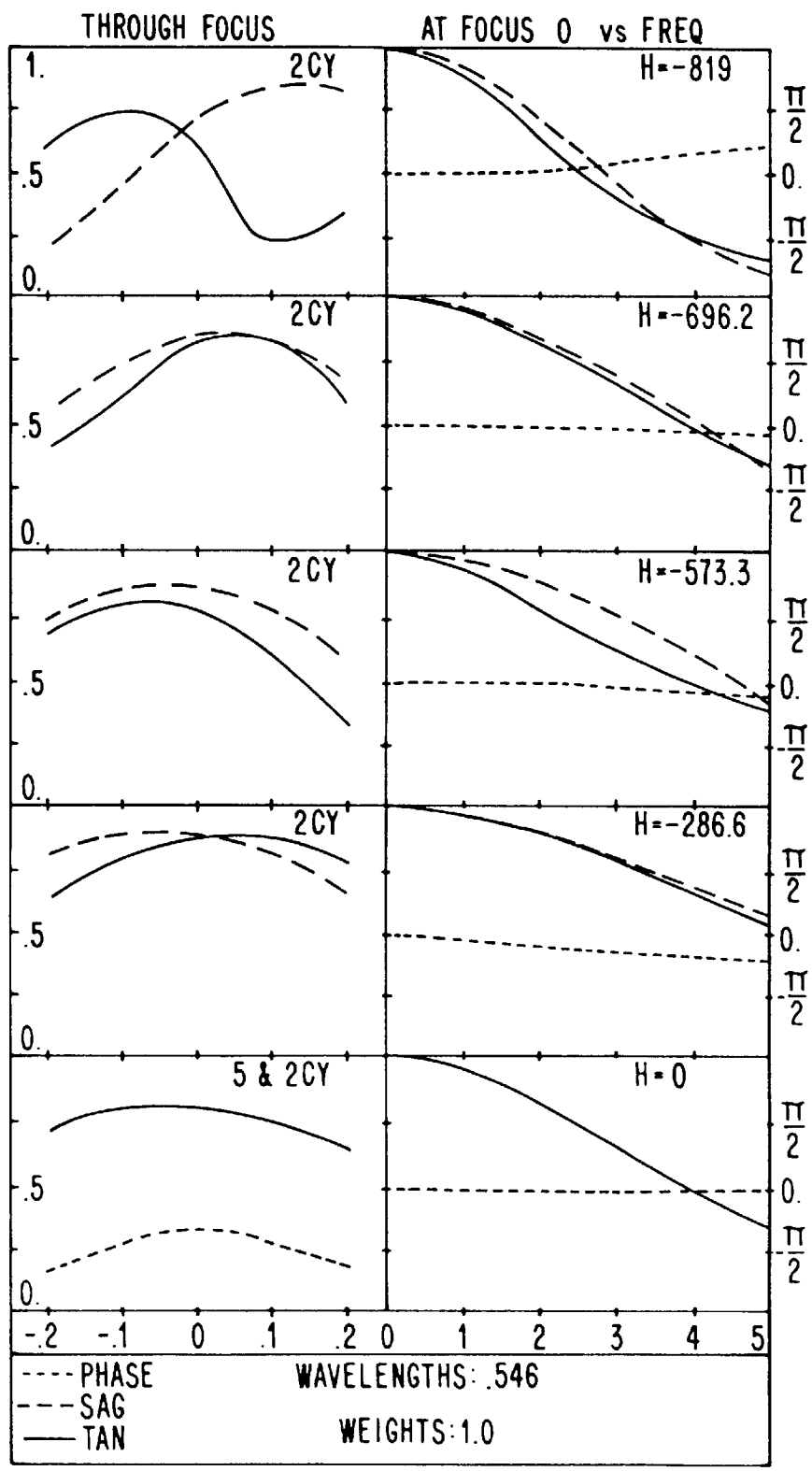

The focal length, magnification, f/number, object height, and image height for the monochromatic optical transfer function plot of FIG. 1C are 67.35, −0.088, 1.11, −819.00, and 64.58, respectively.

Figure 2A:
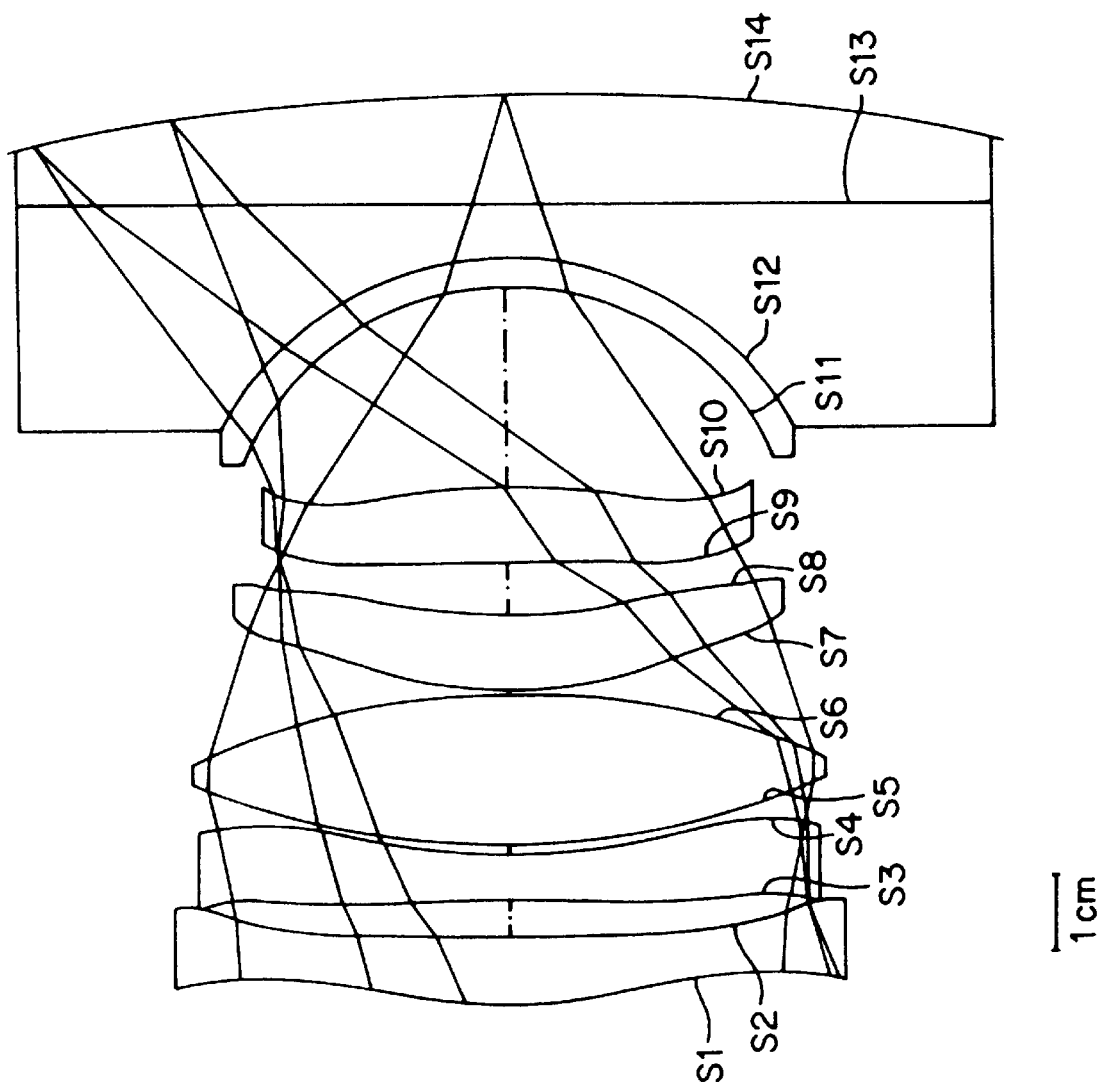
Figure 2B:
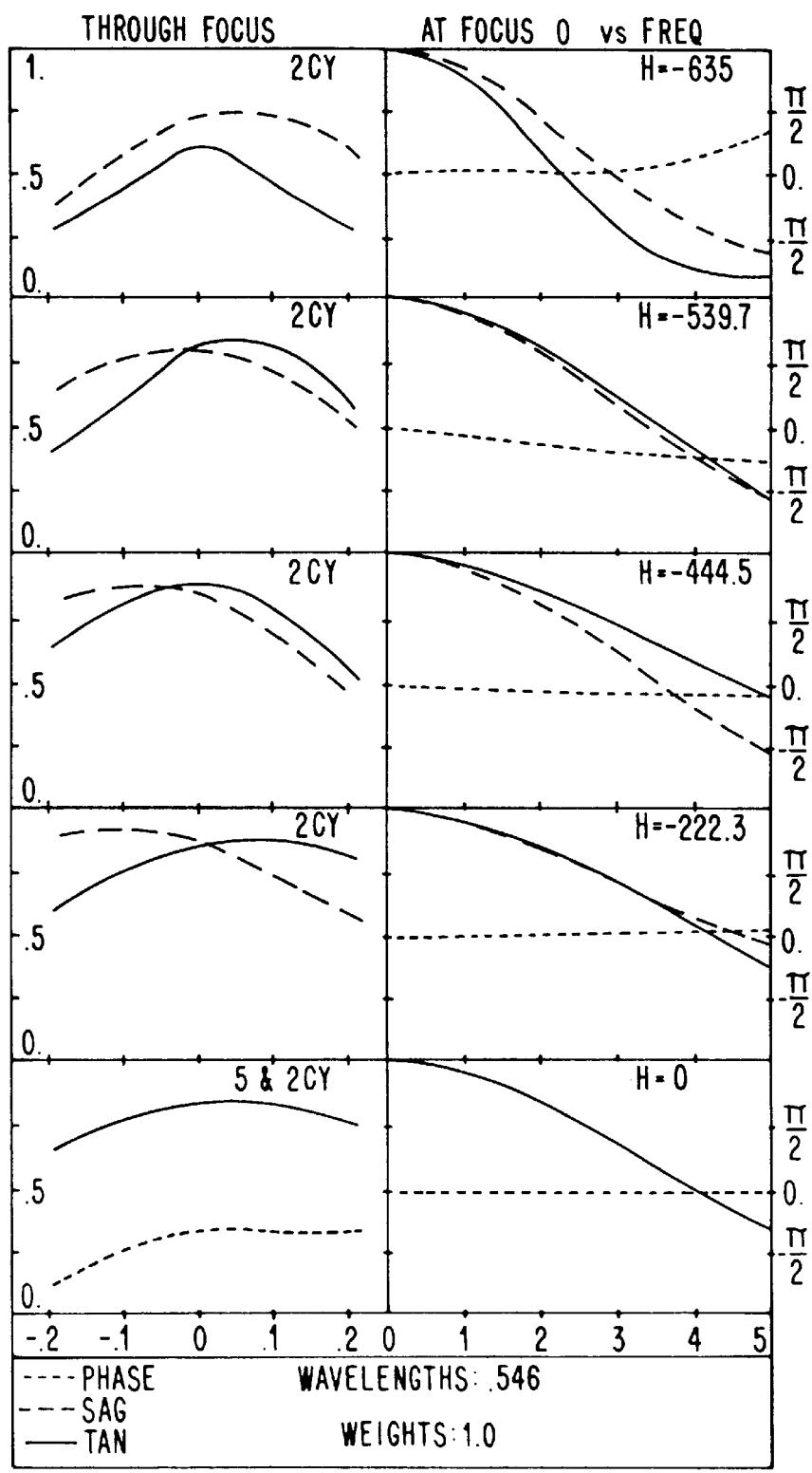

The focal length, magnification, f/number, object height, and image height for the monochromatic optical transfer function plot of FIG. 2B are 71.67, −0.101, 1.07, −635.00, and 63.29, respectively.

Figure 2C:
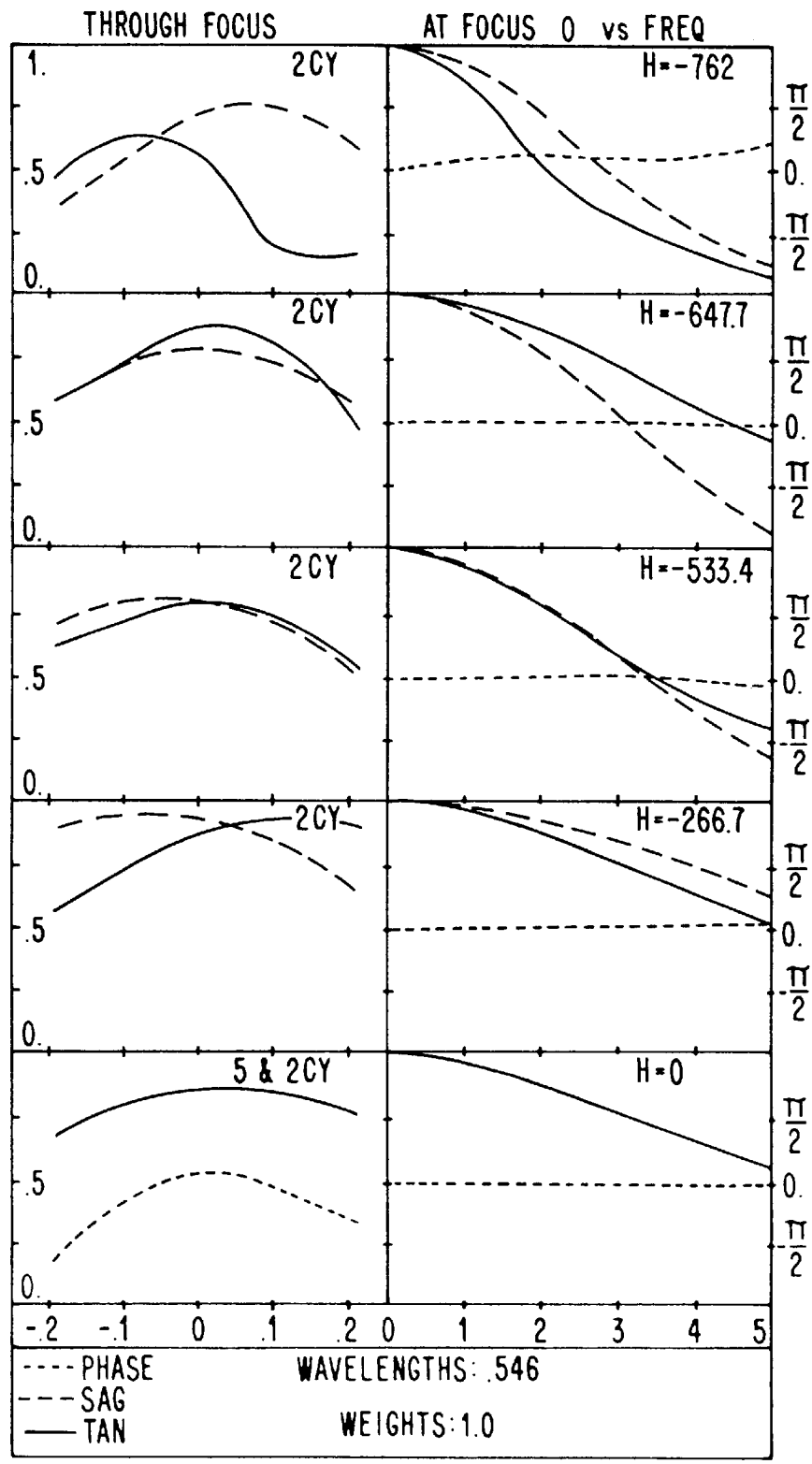

The focal length, magnification, f/number, object height, and image height for the monochromatic optical transfer function plot of FIG. 2C are 72.07, −0.084, 1.07, −762.00, and 63.34, respectively.

Figure 3A:
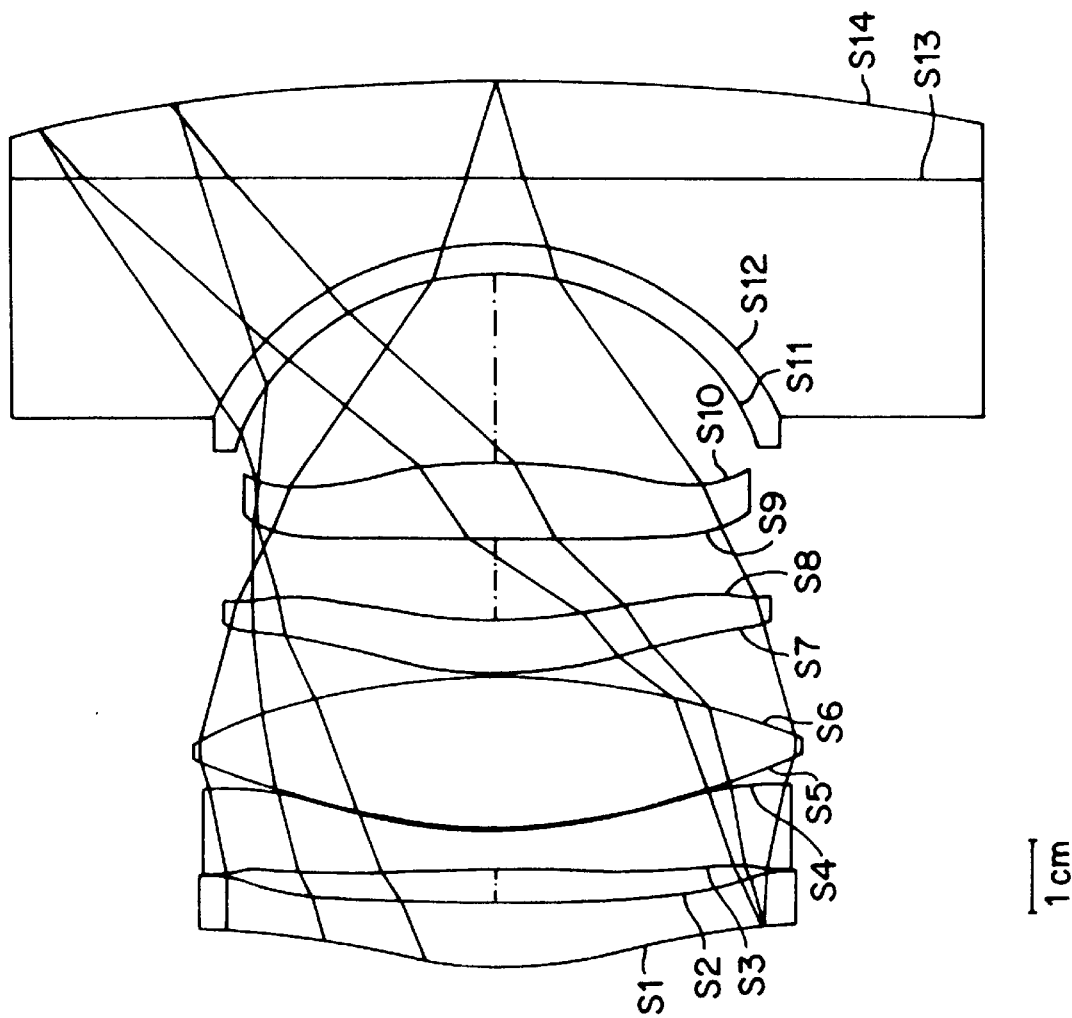
Figure 3B:
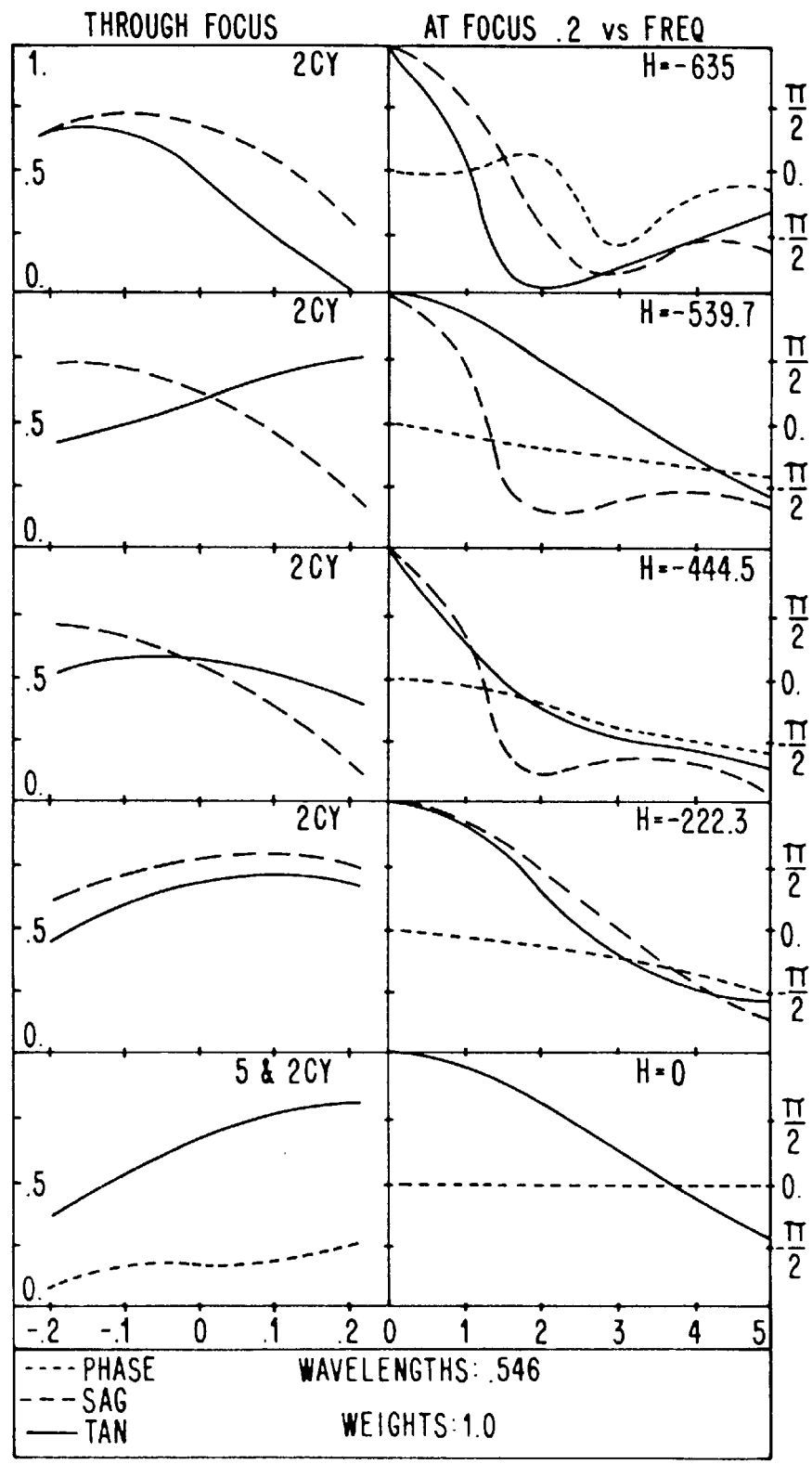

The focal length, magnification, f/number, object height, and image height for the monochromatic optical transfer function plot of FIG. 3B are, 71.79, −0.101, 1.07, −635.00, and 63.48, respectively.

Figure 4A:
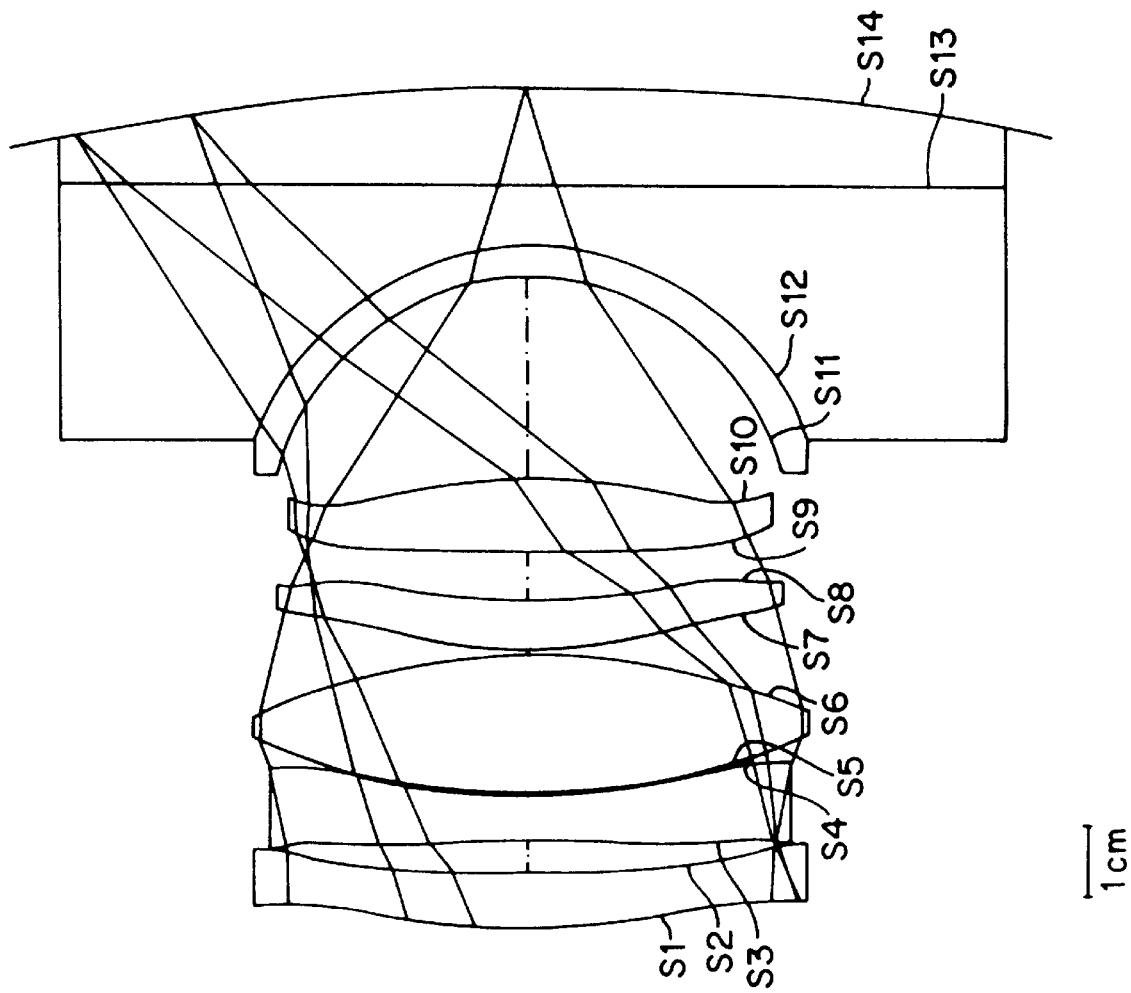
Figure 4B:
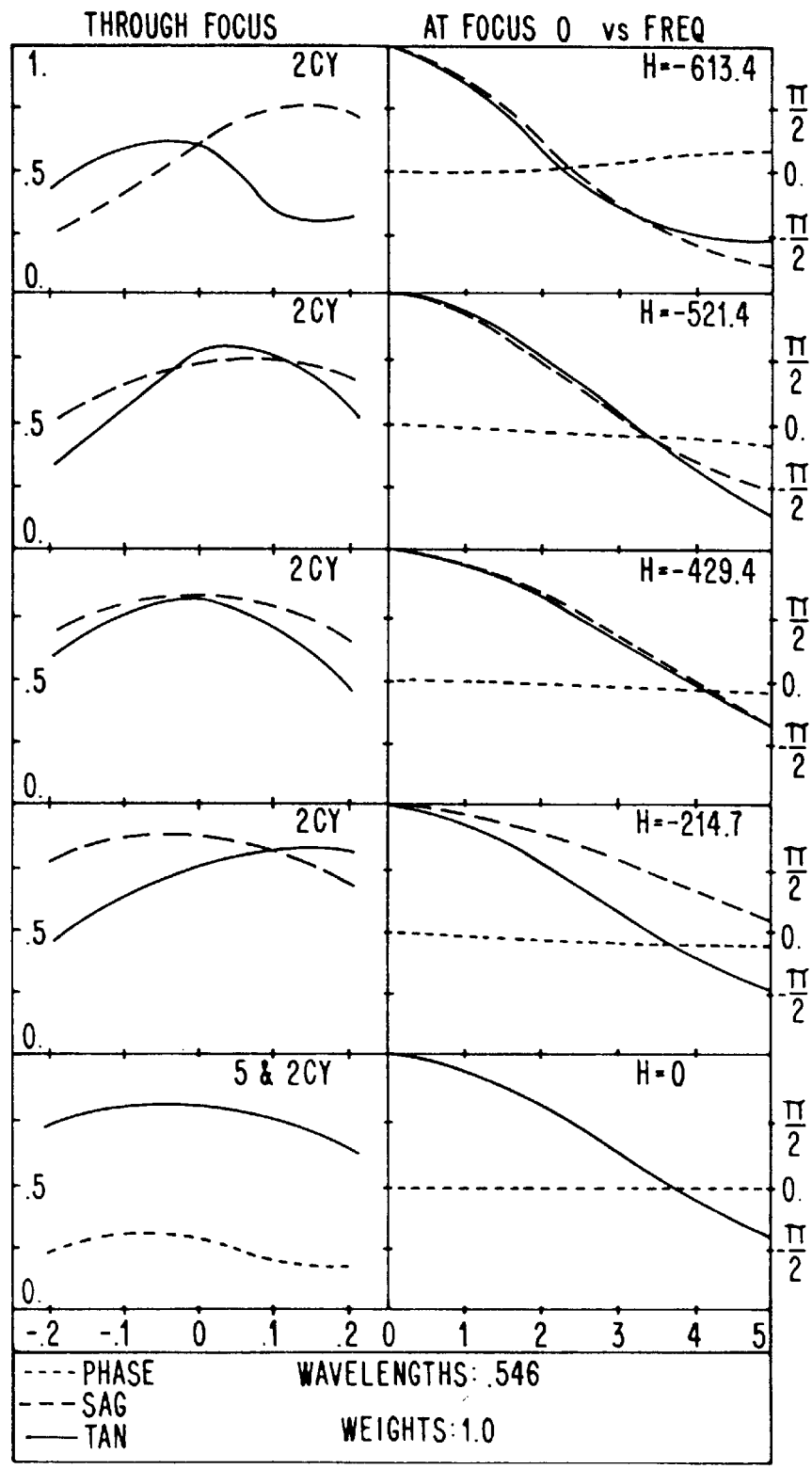

The focal length, magnification, f/number, object height, and image height for the monochromatic optical transfer function plot of FIG. 4B are 66.69, −0.113, 1.12, −613.40, and 63.09, respectively.

Figure 4C:
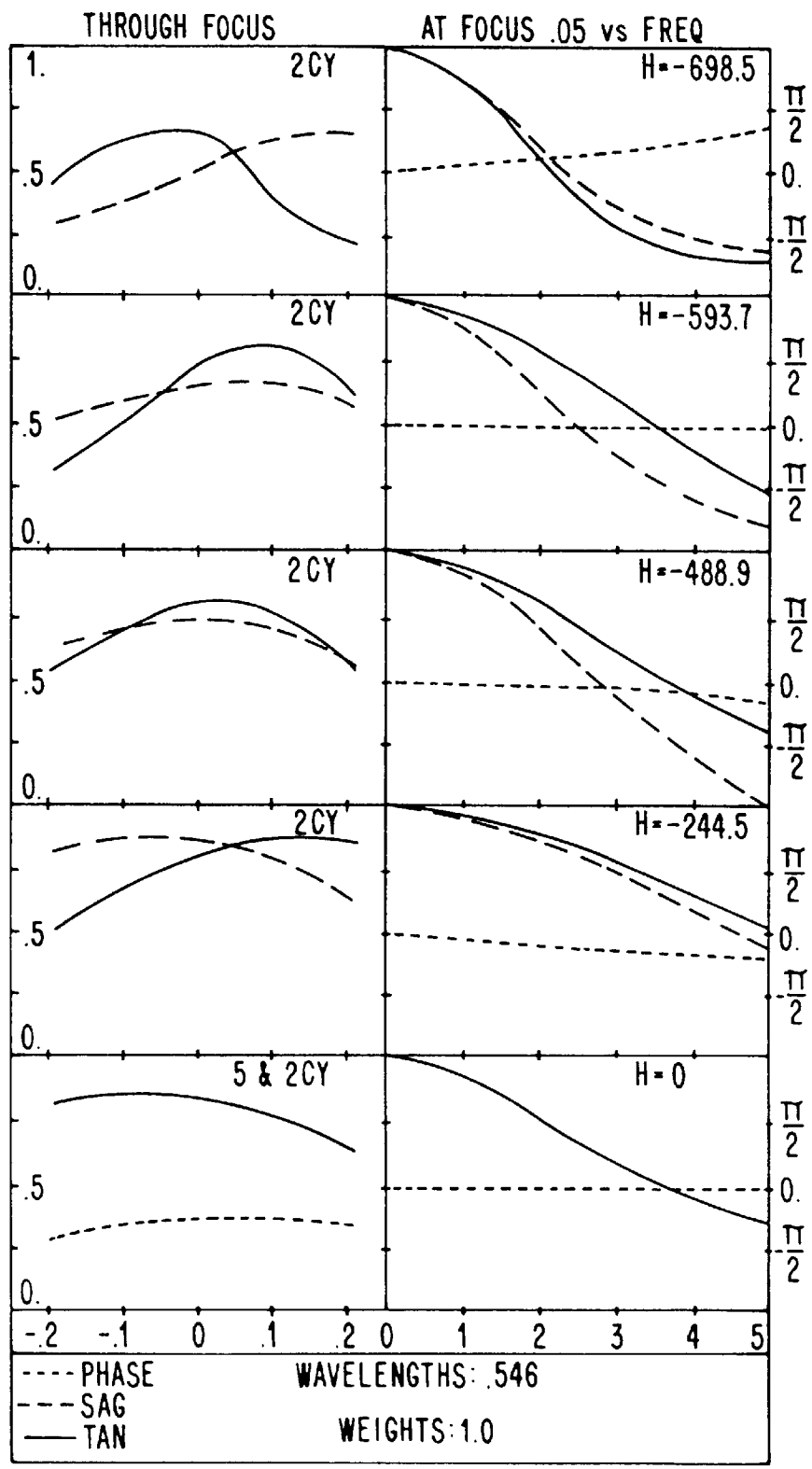

The focal length, magnification, f/number, object height, and image height for the monochromatic optical transfer function plot of FIG. 4C are 67.01, −0.099, 1.12, −698.50, and 63.10, respectively.

Figure 5:
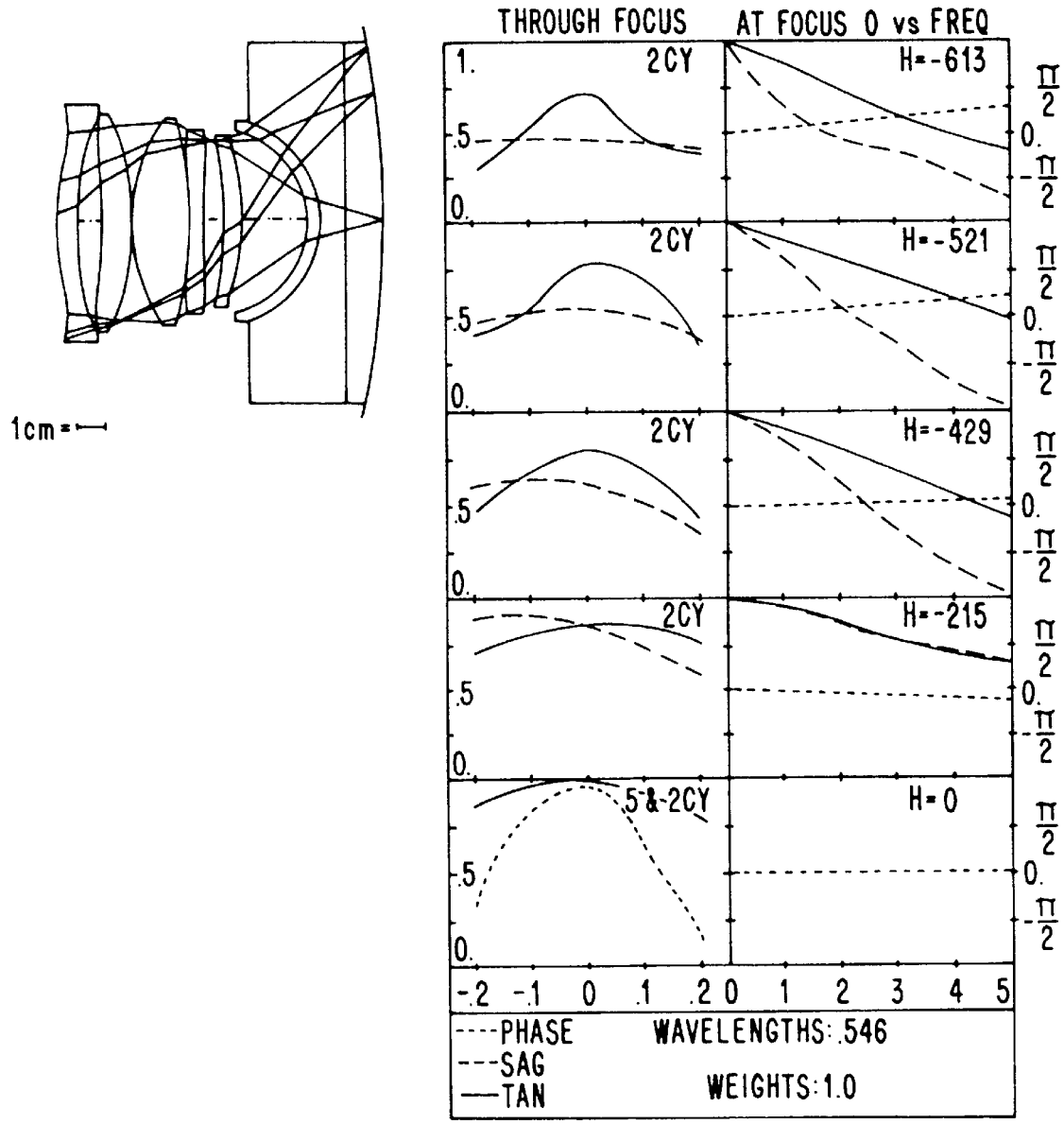
Figure 6:
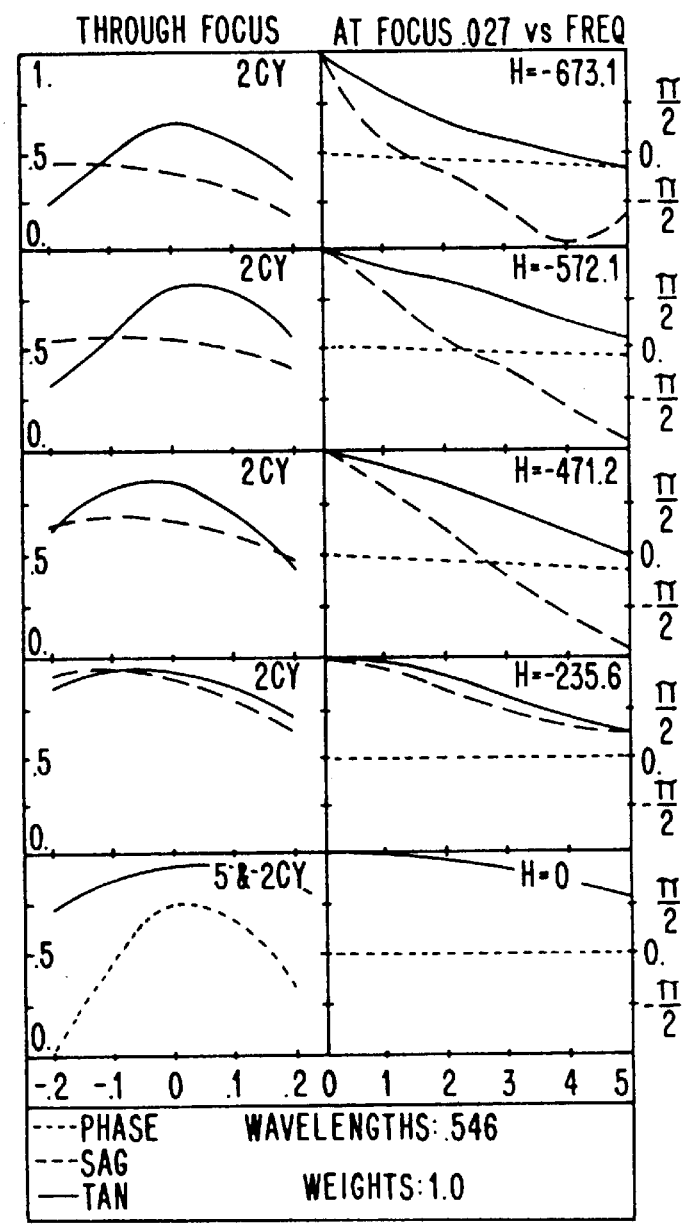

FIGS. 5 and 6 are MTF/OTF plots for prior art lens systems constructed in accordance with U.S. Pat. Nos. 5,329,363 and 5,296,967, respectively.

The focal length, magnification, f/number, object height, and image height for the monochromatic optical transfer function plot of FIG. 5 are 66.75, −0.113, 1.12, −613.40, and 63.35, respectively.

The focal length, magnification, f/number, object height, and image height for the monochromatic optical transfer function plot of FIG. 6 are 74.80, −0.107, 1.09, −673.10, and 66.11, respectively.

Figure 7:
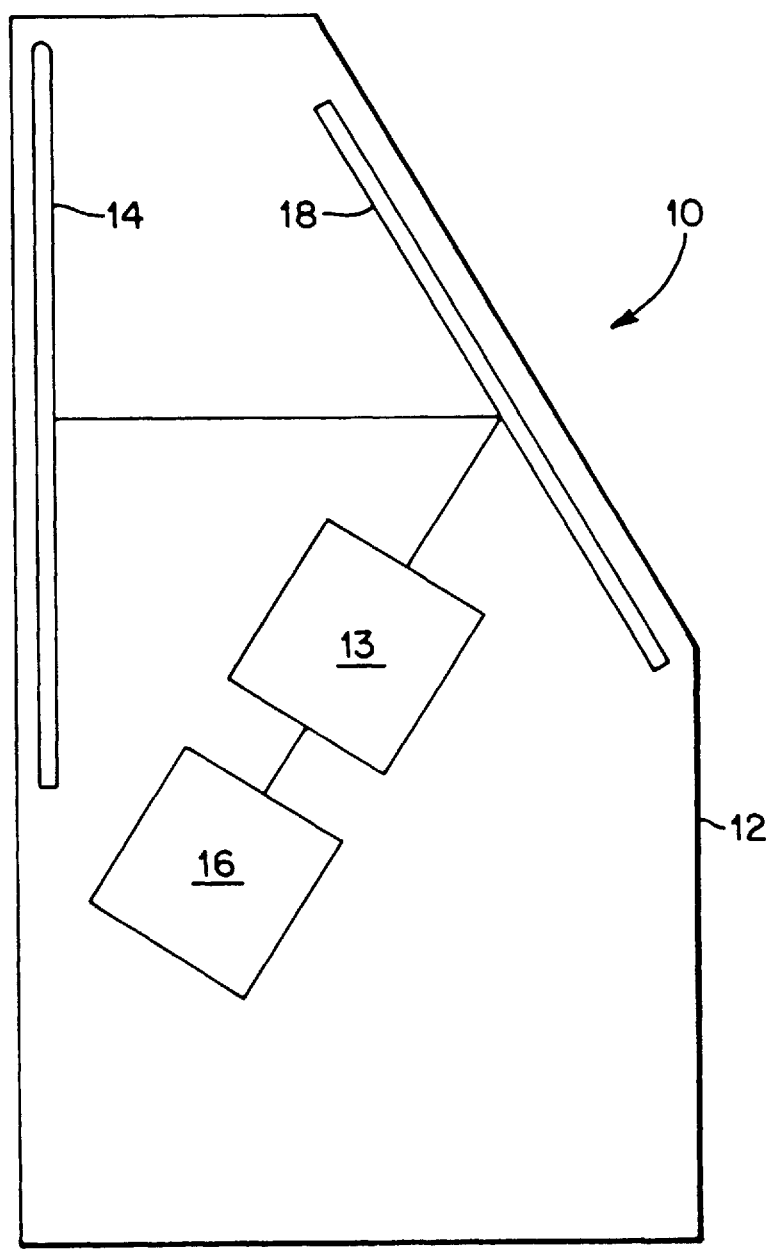

FIG. 7 is a schematic diagram of a projection TV employing a lens system constructed in accordance with the invention.

DESCRIPTION OF THE PREFERRED EMBODIMENTS

As discussed above, the lens systems of the present invention include six components preferably arranged in the following order with regard to power from the lens system's long conjugate to its short conjugate, i.e., from the screen to the CRT: +−+++−. The second negative element is of critical importance with regard to the improvement in sagittal MTF achieved by the present invention.

In prior art systems, such as those of the above-referenced '363 and '967 patents, a balancing was performed between field curvature (Petzval sum) and sagittal oblique spherical aberration. That is, those prior art systems were allowed to have a relatively high level of sagittal oblique spherical aberration and that relatively high level was used, along with other aspects of the lens system, e.g., the strong negative unit near the CRT, to provide the requisite level of field curvature correction at the viewing screen.

A relatively high level of sagittal oblique spherical aberration results in a relatively poor OTF at large field locations, specifically, the presence of substantial levels of this aberration results in MTF values below about 0.5 at 2 cycles/mm at large field locations.

In accordance with the present invention, this problem is addressed by the incorporation of a negative lens element as the second element of the lens system. The presence of this negative element improves the field curvature of the overall system without adding significant other aberrations which would be difficult to correct. This approach should be contrasted with increasing the negative power of the lens unit associated with the CRT (the field flattener) which would also improve field curvature. However, because the field flattener is already a strong unit, adding more negative power would result in other aberrational problems which would be difficult to correct.

The improved field curvature achieved through the use of a negative lens element as the second element of the lens system allows for a better correction of the system's sagittal oblique spherical aberration since the level of this aberration no longer needs to be kept high to balance the system's overall field curvature. Improving the sagittal oblique spherical aberration, in turn, results in the improved sagittal MTF at large field locations as is desired.

FIGS. 1B, 1C, 2B, 2C, 3B, 4B, and 4C illustrate the improved sagittal MTFs achieved through the use of the invention (compare, in particular, the plots at 0.85H of these figures with the corresponding plots of FIGS. 5 and 6). It should be noted that the lens systems of FIGS. 1 and 2 have been fully optimized, while those of FIGS. 3 and 4 have only been partially optimized. Accordingly, the MTFs of FIGS. 3B, 4B, and 4C can be even further improved through further optimization of the lens systems of these figures.

The incorporation of negative power at the screen end of the lens system does tend to result in a somewhat higher level of spherical aberration. However, on balance, the overall performance of the lens system, especially at large field locations, is improved.

The use of a negative second lens element allows for the incorporation of at least some axial color correction in the lens system. This color correction is achieved by making the negative second lens element out of a high dispersion material or, more particularly, by making the negative second lens element out of a material having a higher dispersion than the dispersion of the material used for the positive third lens element.

As used herein, a high dispersion material is one having a dispersion like that of flint glass. More particularly, a high dispersion material is one having a V-value ranging from 20 to 50 for an index of refraction in the range from 1.85 to 1.5, respectively. In contrast, a low dispersion material is one having a dispersion like that of crown glass or, in terms of V-values, one having a V-value ranging from 35 to 75 for an index of refraction in the range from 1.85 to 1.5, respectively.

A preferred high dispersion material for use in constructing the negative second lens element is styrene and a preferred low dispersion material for use in constructing the positive third lens element is a crown-type glass. In place of styrene, other plastics having flint-like dispersions can be used to prepare the negative second lens element, including polycarbonates and copolymers of polystyrene and acrylic such as NAS. See *The Handbook of Plastic Optics*, U.S. Precision Lens, Inc., Cincinnati, Ohio, 1983, pages 17–29.

In addition to making the negative second lens element out of a high dispersion material, the positive first lens element can also be made of such a material. In this way, the lens system's spherochromatism can be reduced as discussed in detail in the above-referenced '363 patent. Lateral color is also improved by the use of such a high dispersion material for the first lens element. A preferred high dispersion material for the positive first lens element is again styrene although other high dispersion materials, such as those discussed directly above, can be used if desired.

Each of elements 1, 2, 4, and 5, as well as the field flattener lens unit, has at least one aspherical surface to facilitate the correction of the aberrations of the lens system and, preferably, each has two aspheric surfaces. Because the lens surfaces are aspheric, the overall shapes of the elements are preferably described in terms of best fit spherical surfaces, rather than the radii of curvature of the elements at the optical axis, although in many cases the description of the overall shapes of the elements in terms of best fit spherical surfaces on the one hand and in terms of the radii of curvature at the optical axis on the other will be the same. See Dunham, C. B., and C. R. Crawford, "Minimax Approximation by a Semi-Circle," *Society for Industrial and Applied Mathematics*, Vol. 17, No. 1, February, 1980.

To maintain a relatively low cost of the lens system, all the aspherical elements are designed to be manufactured in optical plastic. In particular, for ease of molding, a fairly uniform thickness is maintained across the aperture of each of these elements. Because they are plastic, it is desirable to keep the power of the elements as low as possible so as to minimize shifts in focus of the lens system with changes in ambient temperature. As discussed above, the power element (element 3) is preferably made out of glass.

FIGS. 1 to 4 illustrate various lens systems constructed in accordance with the invention. Corresponding prescriptions and optical properties appear in Tables 1 to 4, respectively. HOYA and SCHOTT designations are used for the glasses of element 3. Equivalent glasses made by other manufacturers can be used in the practice of the invention. Industry acceptable materials are used for the styrene and acrylic elements. The material designations 433500 (423500) and 566500 represent the index of refraction and dispersion characteristics of the coupling fluid between S12 and S13 (the CRT faceplate) and between S13 and S14, respectively. Specifically, a $N_e$ value for the material is obtained by adding 1,000 to the first three digits of the designation, and a $V_e$ value is obtained from the last three digits by placing a decimal point before the last digit.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero for the lens systems of Tables 1 through 4.

The abbreviations used in the tables are as follows:

| | |
|---|---|
| EFL | effective focal length |
| FVD | front vertex distance |
| f/ | f-number |
| ENP | entrance pupil |
| EXP | exit pupil |
| BRL | barrel length |
| OBJ HT | object height |
| MAG | magnification |
| STOP | location of aperture stop |
| IMD | image distance |
| OBD | object distance |
| OVL | overall length |

The designation "a" associated with various surfaces in the tables represents an aspheric surface. All dimensions given in the tables are in millimeters. The tables are constructed on the assumption that light travels from left to right in the figures and that the "object" is on the left and the "image" is on the right. In actual practice, the object (CRT) is on the right and the image (viewing screen) is on the left.

The half fields of view at their shortest focal lengths in the direction of the viewing screen for the lens systems of Tables 1 through 4 are as follows:

| | |
|---|---|
| Table 1 | 43.6° |
| Table 2 | 38.5° |
| Table 3 | 38.0° |
| Table 4 | 42.4° |

FIG. 7 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a lens system constructed in accordance with the invention and module 16 illustrates its associated CRT tube. In practice, three lens systems 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

Lens Data

| Surf. No. | Type | Radius | Thickness | Glass | Clear Aperture Diameter |
|---|---|---|---|---|---|
| 1 | a | 74.1674 | 8.00000 | STYRENE | 73.45 |
| 2 | a | 287.9539 | 4.33253 | | 68.12 |
| 3 | a | −251.5806 | 6.00000 | ACRYLIC | 68.06 |
| 4 | a | 92.5487 | 0.50000 | | 72.15 |
| 5 | | 97.4261 | 18.82008 | BACD18 | 74.56 |
| 6 | | −97.4261 | 0.50000 | | 74.82 |
| 7 | a | 70.9771 | 7.00000 | ACRYLIC | 69.11 |
| 8 | a | 80.1772 | 6.41882 | | 66.81 |
| 9 | a | 619.8514 | 10.00000 | ACRYLIC | 66.13 |
| 10 | a | −76.5444 | Space 1 | | 66.62 |
| 11 | a | −41.6430 | 4.00000 | ACRYLIC | 69.70 |
| 12 | | −41.3000 | 7.00000 | 433500 | 75.49 |
| 13 | | ∞ | 14.60000 | 566500 | 120.00 |
| 14 | | −350.0000 | Image distance | | 130.00 |

Symbol Description a - Polynomial asphere
Object and Image Surface

| Surface | Radius |
|---|---|
| Image | −350.0000 |

Even Polynomial Aspheres

| Surf. No. | D | E | F | G | H | I |
|---|---|---|---|---|---|---|
| 1 | −2.9789E-06 | −2.4325E-10 | −3.0877E-13 | 2.9847E-16 | −4.7530E-20 | 3.1078E-23 |
| 2 | −1.0164E-06 | 2.6434E-09 | −3.0400E-13 | 3.9136E-16 | −1.0798E-18 | 4.2216E-22 |
| 3 | 2.3741E-06 | 9.2964E-10 | −4.6692E-13 | −7.1667E-16 | −5.3326E-19 | 3.1392E-22 |

TABLE 1-continued

| | | | | | |
|---|---|---|---|---|---|
| 4 | 1.5056E-06 | −3.4513E-09 | 1.0655E-12 | −2.8420E-16 | −1.9546E-19 | 2.1177E-22 |
| 7 | −4.3229E-06 | 4.3275E-09 | −5.0739E-12 | 4.1364E-16 | 5.2528E-19 | 6.42941-22 |
| 8 | −4.0759E-06 | 5.2380E-10 | −1.5152E-12 | −1.7269E-15 | 1.1311E-18 | 7.7614E-22 |
| 9 | −1.5854E-07 | 4.3268E-11 | 8.2367E-12 | −1.5075E-14 | 1.2090E-17 | −3.5135E-21 |
| 10 | 1.2892E-06 | 2.0668E-09 | −2.2493E-12 | 8.5919E-15 | −7.9322E-18 | 2.2602E-21 |
| 11 | −7.9466E-06 | 1.8644E-08 | −3.6845E-11 | 4.1109E-14 | −2.3688E-17 | 5.1803E-21 |

Variable Spaces

| Zoom Pos. | Space 1 T(10) | Focal Shift | Image Distance |
|---|---|---|---|
| 1 | 27.799 | 0.945 | 0.000 |
| 2 | 27.585 | 1.073 | 0.000 |

WAVELENGTHS

| | | | | |
|---|---|---|---|---|
| 0.54610 | 0.48000 | 0.64380 | 0.43580 | 0.70652 |

SYSTEM FIRST ORDER PROPERTIES, POS 1

| | | | | | |
|---|---|---|---|---|---|
| OBJ. HT: | −766.00 f/ 1.11 | MAG: | −0.0939 | | |
| STOP: | 9.80 after surface 5. | DIA: | 74.718 | | |
| EFL: | 67.2199 | FVD: | 114.977 | ENP: | 22.7029 |
| IMD: | 0.713098E-02 | BRL: | 114.970 | EXP: | −57.4357 |
| OBD: | −782.946 | OVL: | 897.923 | | |

SYSTEM FIRST ORDER PROPERTIES, POS 2

| | | | | | |
|---|---|---|---|---|---|
| OBJ. HT: | −819.00 f/ 1.11 | MAG: | −0.0879 | | |
| STOP: | 9.80 after surface 5. | DIA: | 74.649 | | |
| EFL: | 67.3558 | FVD: | 114.763 | ENP: | 22.7029 |
| IMD: | 0.713480E-02 | BRL: | 114.756 | EXP: | −57.3323 |
| OBD: | −833.920 | OVL: | 948.683 | | |

First Order Properties of Elements

| Element Number | Surface Numbers | Power | f' | lpp | l'pp |
|---|---|---|---|---|---|
| 1 | 1 2 | 0.60387E-02 | 165.60 | −1.7162 | −6.6629 |
| 2 | 3 4 | −0.73401E-02 | −136.24 | 2.9196 | −1.0740 |
| 3 | 5 6 | 0.12668E-01 | 78.941 | 5.9582 | −5.9582 |
| 4 | 7 8 | 0.99904E-03 | 1001.0 | −28.887 | −32.632 |
| 5 | 9 10 | 0.72131E-02 | 138.64 | 5.9870 | −0.73933 |
| 6 | 11 12 | 0.47809E-03 | 2091.7 | 66.965 | 66.414 |
| 7 | 12 13 | −0.10484E-01 | −95.381 | 0.00000E+00 | −4.8849 |
| 8 | 13 14 | 0.16171E-02 | 618.37 | 9.3231 | −0.25547E-06 |

First-Order Properties of The Field Flattener

| Element Numbers | Surface Numbers | Power | f' | lpp | l'pp |
|---|---|---|---|---|---|
| 6 8 | 11 14 | −0.84330E-02 | −118.58 | −3.6946 | −21.184 |

First Order Properties of Groups

| Group Number | Surface Numbers | Power | f' | lpp | l'pp |
|---|---|---|---|---|---|
| 1 | 1 10 | 0.16624E-01 | 60.153 | 26.914 | −23.581 |
| 2 | 11 14 | −0.84330E-02 | −118.58 | −3.6946 | −21.184 |

First Order Properties of the Lens

| Zoom Position Number | Power | f' | lpp | l'pp |
|---|---|---|---|---|
| 1 | 0.14877E-01 | 67.220 | −0.11772 | −74.472 |
| 2 | 0.14847E-01 | 67.356 | −0.50741E-01 | −74.340 |

TABLE 2

Lens Data

| Surf. No. | Type | Radius | Thickness | Glass | Clear Aperture Diameter |
|---|---|---|---|---|---|
| 1 | a | 71.3465 | 9.00000 | ACRYLIC | 88.04 |
| 2 | a | 474.9761 | 4.93123 | | 80.73 |
| 3 | a | −269.6862 | 6.00000 | ACRYLIC | 80.57 |
| 4 | a | 103.2843 | 1.00000 | | 81.79 |
| 5 | | 110.1982 | 20.00000 | SK18 | 83.27 |
| 6 | | −110.1982 | 0.50000 | | 83.19 |
| 7 | a | 57.8185 | 10.00000 | ACRYLIC | 72.05 |
| 8 | a | 77.1250 | 7.25110 | | 67.27 |
| 9 | a | −637.2479 | 10.60000 | ACRYLIC | 63.80 |
| 10 | a | −87.0581 | Space 1 | | 64.04 |
| 11 | a | −48.8683 | 4.00000 | ACRYLIC | 69.34 |
| 12 | | −44.0000 | 7.00000 | 423500 | 75.09 |
| 13 | | ∞ | 14.10000 | 566500 | 120.00 |
| 14 | | −350.0000 | Image distance | | 130.00 |

Symbol Description a - Polynomial asphere

Object and Image Surface

| Surface | Radius |
|---|---|
| Image | −350.0000 |

Even Polynomial Aspheres

| Surf. No. | D | E | F | G | H | I |
|---|---|---|---|---|---|---|
| 1 | −2.8922E−06 | −1.0647E−09 | 2.4696E−13 | 1.4106E−16 | 1.9463E−20 | −2.0344E−23 |
| 2 | −1.0816E−06 | 1.9321E−09 | −4.9693E−13 | 3.8820E−16 | −4.8560E−19 | 1.6310E−22 |
| 3 | 2.2295E−06 | 5.0884E−10 | −6.0202E−14 | −4.5888E−16 | −2.9544E−19 | 1.8794E−22 |
| 4 | 5.6595E−07 | −1.8272E−09 | 1.6732E−13 | 1.5329E−17 | −3.9560E−21 | 1.7123E−23 |
| 7 | −1.5032E−06 | 9.0850E−10 | −2.6234E−12 | 3.0813E−16 | 2.7131E−19 | 3.3196E−22 |
| 8 | −1.3761E−06 | −6.4372E−10 | −9.1910E−13 | −1.0402E−15 | 7.8305E−19 | 5.3585E−22 |
| 9 | 2.3662E−07 | 1.1168E−09 | 4.8664E−12 | −5.5210E−15 | 2.7719E−18 | −5.4088E−22 |
| 10 | 2.2145E−06 | 1.9525E−09 | −2.2516E−12 | 1.1537E−14 | −1.0936E−17 | 3.1154E−21 |
| 11 | −5.4861E−06 | 8.9889E−09 | −2.0404E−11 | 2.4235E−14 | −1.4368E−17 | 3.0415E−21 |

Variable Spaces

| Zoom Pos. | Space 1 T(10) | Focal Shift | Image Distance |
|---|---|---|---|
| 1 | 27.464 | 0.224 | 0.000 |
| 2 | 26.695 | 0.465 | 0.000 |

WAVELENGTHS

| 0.54610 | 0.48000 | 0.64380 | 0.43580 | 0.70652 |
|---|---|---|---|---|

SYSTEM FIRST ORDER PROPERTIES, POS 1

| | | | | | |
|---|---|---|---|---|---|
| OBJ. HT: | −635.00 f/ 1.07 | MAG: | −0.1007 | | |
| STOP: | 19.47 after surface 5. | DIA: | 83.007 | | |
| EFL: | 71.6673 | FVD: | 121.847 | ENP: | 33.0509 |
| IMD: | −.894070E−06 | BRL: | 121.847 | EXP: | −57.8385 |
| OBD: | −780.554 | OVL: | 902.400 | | |

SYSTEM FIRST ORDER PROPERTIES, POS 2

| | | | | | |
|---|---|---|---|---|---|
| OBJ. HT: | −762.00 f/ 1.07 | MAG: | −0.0839 | | |
| STOP: | 19.47 after surface 5. | DIA: | 80.908 | | |
| EFL: | 72.0681 | FVD: | 121.078 | ENP: | 33.0509 |
| IMD: | 0.692606E−04 | BRL: | 121.078 | EXP: | −57.3892 |
| OBD: | −927.797 | OVL: | 1048.87 | | |

First Order Properties of Elements

| Element Number | Surface Numbers | | Power | f' | lpp | l'pp |
|---|---|---|---|---|---|---|
| 1 | 1 | 2 | 0.59246E−02 | 168.79 | −1.0572 | −7.0381 |
| 2 | 3 | 4 | −0.66468E−02 | −150.45 | 2.8890 | −1.1064 |
| 3 | 5 | 6 | 0.11226E−01 | 89.078 | 6.3168 | −6.3168 |

TABLE 2-continued

| | | | | | |
|---|---|---|---|---|---|
| 4 | 7 8 | 0.25039E-02 | 399.38 | −17.118 | −22.833 |
| 5 | 9 10 | 0.49281E-02 | 202.92 | 8.1669 | 1.1157 |
| 6 | 11 12 | 0.14216E-02 | 703.43 | 21.139 | 19.033 |
| 7 | 12 13 | −0.96136E-02 | −104.02 | 0.00000E+00 | −49192 |
| 8 | 13 14 | 0.16171E-02 | 618.37 | 9.0038 | 0.11614E-06 |

First-Order Properties of The Field Flattener

| Element Numbers | Surface Numbers | Power | f' | lpp | l'pp |
|---|---|---|---|---|---|
| 6 8 | 11 14 | −0.66010E-02 | −151.49 | −4.7048 | −21.927 |

First Order Properties of Groups

| Group Number | Surface Numbers | Power | f' | lpp | l'pp |
|---|---|---|---|---|---|
| 1 | 1 10 | 0.15288E-01 | 65.413 | 27.495 | −29.431 |
| 2 | 11 14 | −0.66010E-02 | −151.49 | −4.7048 | −21.927 |

First Order Properties of the Lens

| Zoom Position Number | Power | f' | lpp | l'pp |
|---|---|---|---|---|
| 1 | 0.13953E-01 | 71.667 | 2.8051 | −79.108 |
| 2 | 0.13876E-01 | 72.068 | 3.0328 | −78.581 |

TABLE 3

Lens Data

| Surf. No. | Type | Radius | Thickness | Glass | Clear Aperture Diameter |
|---|---|---|---|---|---|
| 1 | a | 67.3941 | 9.00000 | ACRYLIC | 80.19 |
| 2 | a | 466.5153 | 4.33006 | | 75.26 |
| 3 | a | −377.8122 | 6.00000 | STYRENE | 75.21 |
| 4 | a | 96.8284 | 0.50000 | | 79.05 |
| 5 | | 102.5189 | 20.00000 | BACD18 | 81.76 |
| 6 | | −102.5189 | 0.50000 | | 81.88 |
| 7 | a | 61.3027 | 7.42000 | ACRYLIC | 73.37 |
| 8 | a | 73.0248 | 11.15820 | | 71.36 |
| 9 | a | 1239.7390 | 10.60000 | ACRYLIC | 67.62 |
| 10 | a | −83.0838 | 25.92460 | | 66.39 |
| 11 | a | −47.9502 | 4.00000 | ACRYLIC | 70.14 |
| 12 | | −43.7780 | 9.00000 | 433500 | 75.68 |
| 13 | | ∞ | 13.00000 | 566500 | 120.00 |
| 14 | | −350.0000 | −0.00106 | | 130.00 |

Symbol Description a - Polynomial asphere

Object and Image Surface

| Surface | Radius |
|---|---|
| Image | −350.0000 |

Focal Shift = 0.06875

Even Polynomial Aspheres

| Surf. No. | D | E | F | G | H | I |
|---|---|---|---|---|---|---|
| 1 | −2.6255E-06 | −4.9008E-10 | 3.3009E-14 | 5.0819E-17 | 5.4790E-21 | 8.3799E-24 |
| 2 | −7.0677E-07 | 2.2103E-09 | −2.2134E-13 | 1.9732E-16 | −5.9307E-19 | 1.8020E-22 |
| 3 | 1.9964E-06 | 4.9793E-10 | −2.9749E-13 | −3.7876E-16 | −2.5536E-19 | 1.5078E-22 |
| 4 | 9.7271E-07 | −1.7446E-09 | 1.1026E-13 | −8.8290E-17 | 7.5451E-21 | 4.9259E-23 |
| 7 | −3.2052E-06 | 2.6523E-09 | −2.9026E-12 | −1.5554E-16 | 3.2886E-19 | 2.6018E-22 |
| 8 | −3.0346E-06 | −2.1310E-10 | −4.5092E-13 | −7.7109E-16 | 2.1257E-19 | 3.3940E-22 |
| 9 | −3.5824E-07 | 5.4545E-10 | 3.6603E-12 | −5.2265E-15 | 4.1407E-18 | −1.2450E-21 |
| 10 | 8.7765E-07 | 3.7964E-09 | −6.0710E-12 | 1.0036E-14 | −6.2761E-18 | 1.4278E-21 |
| 11 | −7.140SE-06 | 1.4096E-08 | −2.4445E-11 | 2.4265E-14 | −1.2615E-17 | 2.2349E-21 |

TABLE 3-continued

WAVELENGTHS

| 0.54610 | 0.48000 | 0.64380 | 0.43580 | 0.70652 |

SYSTEM FIRST ORDER PROPERTIES, POS 1

| | | | | | | |
|---|---|---|---|---|---|---|
| OBJ. HT: | −635.00 f/ 1.07 | MAG: | −0.1007 | | | |
| STOP: | −1.10 after surface 7. | DIA: | 77.940 | | | |
| EFL: | 71.7938 | FVD: | 121.432 | ENP: | 31.6572 | |
| IMD: | −.106475E-02 | BRL: | 121.433 | EXP: | −59.0229 | |
| OBD: | −780.942 | OVL: | 902.374 | | | |

First Order Properties of Elements

| Element Number | Surface Numbers | Power | f' | lpp | l'pp |
|---|---|---|---|---|---|
| 1 | 1 2 | 0.63150E-02 | 158.35 | −1.0098 | −6.9903 |
| 2 | 3 4 | −0.77555E-02 | −128.94 | 2.9804 | −0.76383 |
| 3 | 5 6 | 0.12034E-01 | 83.100 | 6.3342 | −6.3342 |
| 4 | 7 8 | 0.15635E-02 | 639.59 | −21.482 | −25.590 |
| 5 | 9 10 | 0.63246E-02 | 158.11 | 6.6681 | −0.44688 |
| 6 | 11 12 | 0.12924E-02 | 773.73 | 23.369 | 21.336 |
| 7 | 12 13 | −0.98908E-02 | −101.10 | 0.00000E+00 | −6.2805 |
| 8 | 13 14 | 0.16171E-02 | 618.37 | 8.3014 | 0.19245E-07 |

First-Order Properties of The Field Flattener

| Element Numbers | Surface Numbers | Power | f' | lpp | l'pp |
|---|---|---|---|---|---|
| 6 8 | 11 14 | −0.70002E-02 | −142.85 | −4.5058 | −22.418 |

First Order Properties of the Lens

| Zoom Position Number | Power | f' | lpp | l'pp |
|---|---|---|---|---|
| N/A | 0.13929E-01 | 71.794 | 3.7990 | −79.093 |

TABLE 4

Lens Data

| Surf. No. | Type | Radius | Thickness | Glass | Clear Aperture Diameter |
|---|---|---|---|---|---|
| 1 | a | 72.7223 | 8.00000 | STYRENE | 74.34 |
| 2 | a | 361.1625 | 4.29159 | | 68.93 |
| 3 | a | −248.8336 | 6.00000 | STYRENE | 68.71 |
| 4 | a | 96.6956 | 0.50000 | | 71.97 |
| 5 | | 96.3719 | 18.93274 | BACD18 | 74.63 |
| 6 | | −96.3719 | 0.50000 | | 74.83 |
| 7 | a | 59.6381 | 7.00000 | ACRYLIC | 67.89 |
| 8 | a | 73.7460 | 7.29646 | | 65.90 |
| 9 | a | 630.1397 | 10.00000 | ACRYLIC | 64.48 |
| 10 | a | −78.2915 | Space 1 | | 64.85 |
| 11 | a | −40.9837 | 4.00000 | ACRYLIC | 67.97 |
| 12 | | −41.3000 | 9.00000 | 433500 | 74.21 |
| 13 | | ∞ | 13.10000 | 566500 | 120.00 |
| 14 | | −350.0000 | Image distance | | 130.00 |

Symbol Description a - Polynomial asphere

Object and Image Surface

| Surface | Radius |
|---|---|
| Image | −350.0000 |

Even Polynomial Aspheres

| Surf. No. | D | E | F | G | H | I |
|---|---|---|---|---|---|---|

TABLE 4-continued

| | | | | | | |
|---|---|---|---|---|---|---|
| 1 | −3.0702E−06 | −6.0534E−10 | 4.7302E−14 | 8.7022E−17 | 1.7536E−20 | 2.4543E−23 |
| 2 | −9.0896E−07 | 2.8371E−09 | −4.0459E−13 | 3.1778E−16 | −1.1017E−18 | 4.2539E−22 |
| 3 | 2.5026E−06 | 7.8734E−10 | −4.3261E−13 | −6.6740E−16 | −5.1589E−19 | 3.0118E−22 |
| 4 | 8.6374E−07 | −2.2925E−09 | 2.6467E−13 | −1.2023E−16 | 6.2579E−21 | 8.8362E−23 |
| 7 | −4.1560E−06 | 3.7060E−09 | −4.2118E−12 | −1.5824E−16 | 6.5362E−19 | 5.4656E−22 |
| 8 | −3.6525E−06 | −7.5640E−11 | −6.6934E−13 | −1.3326E−15 | 4.3664E−19 | 7.9491E−22 |
| 9 | −7.3001E−07 | 6.0194E−10 | 5.2717E−12 | −8.7998E−15 | 7.9791E−18 | −2.6947E−21 |
| 10 | 6.1664E−07 | 4.2629E−09 | −8.9931E−12 | 1.7183E−14 | −1.1904E−17 | 2.7699E−21 |
| 11 | −8.1718E−06 | 1.8833E−08 | −3.7507E−11 | 4.1526E−14 | −2.3411E−17 | 4.8657E−21 |

Variable Spaces

| Zoom Pos. | Space 1 T(10) | Focal Shift | Image Distance |
|---|---|---|---|
| 1 | 27.083 | 0.667 | 0.000 |
| 2 | 26.579 | 0.921 | 0.000 |

WAVELENGTHS

| | | | | |
|---|---|---|---|---|
| 0.54610 | 0.48000 | 0.64380 | 0.43580 | 0.70652 |

SYSTEM FIRST ORDER PROPERTIES, POS 1

| | | | | | | |
|---|---|---|---|---|---|---|
| OBJ. HT: | −613.40 f/ 1.12 | | MAG: | −0.1128 | | |
| STOP: | 12.28 after surface 5. | | DIA: | 74.882 | | |
| EFL: | 66.6864 | | FVD: | 115.704 | ENP: | 24.3708 |
| IMD: | 0.218987E−03 | | BRL: | 115.704 | EXP: | −56.8578 |
| OBD: | −658.093 | | OVL: | 773.797 | | |

SYSTEM FIRST ORDER PROPERTIES, POS 2

| | | | | | | |
|---|---|---|---|---|---|---|
| OBJ. HT: | −698.50 f/ 1.12 | | MAG: | −0.0991 | | |
| STOP: | 12.28 after surface 5. | | DIA: | 74.120 | | |
| EFL: | 67.0114 | | FVD: | 115.199 | ENP: | 24.3708 |
| IMD: | 0.724792E−04 | | BRL: | 115.199 | EXP: | −56.6120 |
| OBD: | −743.646 | | OVL: | 858.845 | | |

First Order Properties of Elements

| Element Number | Surface Numbers | Power | f' | lpp | l'pp |
|---|---|---|---|---|---|
| 1 | 1 2 | 0.66014E−02 | 151.48 | −1.2517 | −6.2161 |
| 2 | 3 4 | −0.85991E−02 | −116.29 | 2.6917 | −1.0460 |
| 3 | 5 6 | 0.12798E−01 | 78.139 | 5.9979 | −5.9979 |
| 4 | 7 8 | 0.18437E−02 | 542.39 | −17.018 | −21.044 |
| 5 | 9 10 | 0.70574E−02 | 141.70 | 5.9825 | −0.74330 |
| 6 | 11 12 | 0.29345E−03 | 3407.8 | 109.10 | 109.94 |
| 7 | 12 13 | −0.10484E−01 | −95.381 | 0.00000E+00 | −6.2805 |
| 8 | 13 14 | 0.16171E−02 | 618.37 | 8.3653 | −0.10856E−06 |

First-Order Properties of The Field Flattener

| Element Numbers | Surface Numbers | Power | f' | lpp | l'pp |
|---|---|---|---|---|---|
| 6 8 | 11 14 | −0.86104E−02 | −116.14 | −3.7004 | −21.656 |

First Order Properties of Groups

| Group Number | Surface Numbers | Power | f' | lpp | l'pp |
|---|---|---|---|---|---|
| 1 | 1 10 | 0.16734E−01 | 59.758 | 27.064 | −24.308 |
| 2 | 11 14 | −0.86104E−02 | −116.14 | −3.7004 | −21.656 |

First Order Properties of the Lens

| Zoom Position Number | Power | f' | lpp | l'pp |
|---|---|---|---|---|
| 1 | 0.14996E−01 | 66.686 | −0.31937 | −74.877 |
| 2 | 0.14923E−01 | 67.011 | −0.16162 | −74.570 |

What is claimed is:

1. A projection lens system for use with a cathode ray tube comprising in order from the image side:

(a) a first lens element which has a positive power, at least one aspheric surface, and an overall meniscus shape which is concave to the cathode ray tube;

(b) a second lens element which has a negative power and at least one aspheric surface;

(c) a third lens element which has a positive power and provides a substantial portion of the power of the lens system;

(d) a fourth lens element which has a weak power, at least one aspheric surface, and an overall meniscus shape which is concave to the cathode ray tube;

(e) a fifth lens element which has a positive power, at least one aspheric surface, and a cathode-ray-tube-facing surface the majority of which being convex to the cathode ray tube; and (f) a lens unit which has a strong negative power, the lens unit being associated with the cathode ray tube during use of the lens system, and providing most of the correction for the field curvature of the lens system.

2. The projection lens system of claim 1 wherein the second lens element is composed of a high dispersion material.

3. The projection lens system of claim 2 wherein the high dispersion material is styrene.

4. The projection lens system of claim 2 wherein the first lens element is composed of a high dispersion material.

5. A projection television set comprising a cathode ray tube, a screen, and a projection lens system for projecting light from the cathode ray tube onto the screen to form an image, said projection lens system comprising the projection lens system of claim 2.

6. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 2.

7. The projection lens system of claim 1 wherein the first lens element is composed of a high dispersion material.

8. The projection lens system of claim 7 wherein the high dispersion material is styrene.

9. A projection television set comprising a cathode ray tube, a screen, and a projection lens system for projecting light from the cathode ray tube onto the screen to form an image, said projection lens system comprising the projection lens system of claim 7.

10. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 7.

11. The projection lens system of claim 1 wherein each of the first, second, fourth, and fifth lens elements has two aspheric surfaces.

12. The projection lens system of claim 1 wherein the third lens element is biconvex.

13. The projection lens system of claim 1 wherein the third lens element provides the majority of the power of the lens system.

14. The projection lens system of claim 1 wherein the third lens element is composed of a crown-type glass.

15. The projection lens system of claim 1 wherein the fourth lens element has a positive power.

16. The projection lens system of claim 1 wherein the lens system has a half angle field of view in the direction of the image of about 40 degrees.

17. The projection lens system of claim 1 wherein the f-number of the lens system is about 1.0.

18. A projection television set comprising a cathode ray tube, a screen, and a projection lens system for projecting light from the cathode ray tube onto the screen to form an image, said projection lens system comprising the projection lens system of claim 1.

19. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 1.

\* \* \* \* \*